Figure 1:
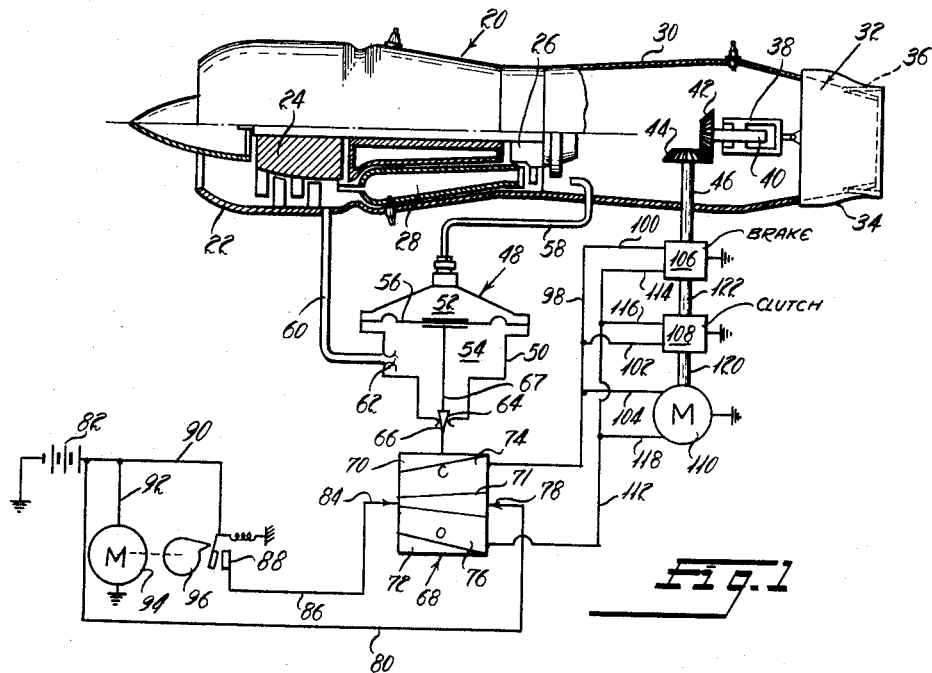

May 17, 1960

W. E. REED 2,936,579

PULSE CONTROL

Filed May 23, 1956

INVENTOR
WENDELL E. REED

BY

ATTORNEYS

United States Patent Office 2,936,579
Patented May 17, 1960

2,936,579

PULSE CONTROL

Wendell E. Reed, San Diego, Calif., assignor to Solar Aircraft Company, San Diego, Calif., a corporation of California Application May 23, 1956, Serial No. 586,716

3 Claims. (Cl. 60—35.6)

This invention relates to systems for positioning elements and more particularly to systems for moving an element from an uncorrected position to a desired corrected position by the intermittent application of the actuating force as the element approaches its correct position.

While the systems of the present invention are of general application, for present purposes they will be disclosed as a system for positioning the nozzle of a turbojet engine since it is in an environment of this kind that the advantages of the invention are at present more fully realized.

As is well known in the art the variable nozzles on jet engines are required to change the area of the outlet orifice to promote and maintain engine efficiency despite widely varying conditions of altitude, speed, temperature, and power setting. During sustained flight at a given altitude and speed, ordinarily the changes in nozzle setting will be relatively small and in the nature of trimming corrections. However during sudden changes in the engine power setting and particularly during initiation or cessation of afterburning, the position of the nozzle must be changed rapidly between substantially full open and full closed positions to prevent damage to or even destruction of the aircraft engine.

In the present day engines the movable components of the jet nozzle have considerable mass and require a relatively high energy input to effect the movement of the nozzle in the required time. Even in the best nozzle designs, the nozzle portions, if tightly sealed, often develop a relatively high frictional resistance to movement. Often a design is such that the nozzle tends to stick because of the fact that the static friction of the parts is substantially greater than their sliding friction.

Because of the significant effect of nozzle position on engine performance it is important that movement of the nozzle past its true corrected position be avoided. Such movement or hunting could establish and possibly promote pressure surges within the engine which lessen efficiency and prevent the attainment of maximum performance.

Accordingly the actuating and control systems for such nozzles must meet a number of exacting requirements to assure the necessary precise and rapid positioning of the relatively massive nozzle elements over both large and small increments of motion. Further, such systems must have minimum bulk and weight for efficient practical use in aircraft.

It is accordingly the principal purpose and object of the present invention to provide novel control and actuating systems satisfying the above stated requirements.

In accomplishing this objective the present invention comprises in combination a device for generating a control signal having a magnitude and sign corresponding to the error in the position of the nozzle, a power train for operating the nozzle, and means responsive to the generated control signal to actuate the power train continuously for moving the nozzle toward corrected position when large position errors are involved and for connecting the power train intermittently to the nozzle when the nozzle is in, or reaches a position fairly close to, its final corrected position. Preferably the power train includes a reversible electric motor and a clutch and the intermittent transmission of power from the motor to the nozzle is effected by alternately engaging and disengaging the clutch while constantly energizing the motor to preserve the high rotational energy of the motor.

It is a further object of the present invention to provide novel control and actuating systems for moving elements toward a correct position which are of light, compact construction.

It is also an object of the present invention to provide novel control and actuating systems for moving elements toward a correct position which provide for rapid, positive movement of the elements and yet which avoid movement of the element past its correct position thus substantially eliminating hunting, surging and pendulum action.

It is an additional object of the invention to provide novel control systems of the type described which may be rendered insensitive to minor transient errors.

It is also an object of the invention to provide novel control systems particularly adapted for regulating the position of a variable nozzle which effectively move the nozzle at a decreased rate when it approaches its corrected position while maintaining the energy available for actuating the nozzle substantially constant.

It is a further object of the present invention to provide novel control and actuating systems which are asymmetrically reversible to provide different sensitivities and different actuation rates for moving the element to be controlled in opposite directions.

Figure 2:
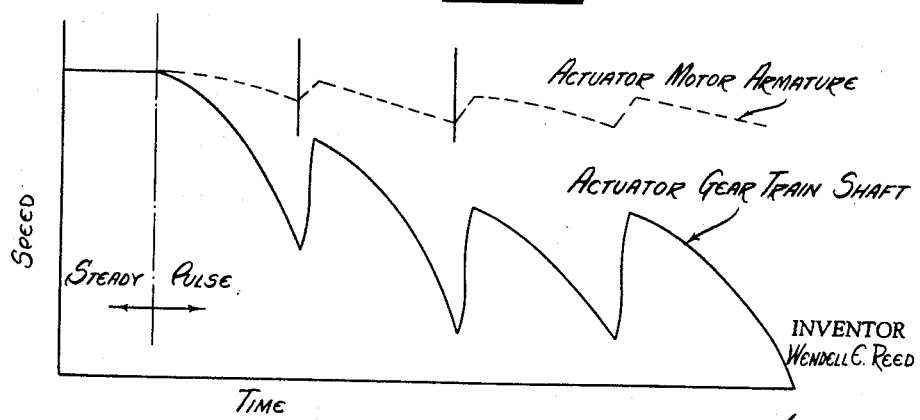

Additional objects and advantages will become apparent as the description proceeds in connection with the accompanying drawings in which:

Figure 1 which is partly diagrammatic illustrates a system of the present invention utilized to control the position of a nozzle on a turbojet engine; and Figure 2 is a graph showing the speed of elements of the power train during part of a cycle of operation.

Referring now more particularly to the drawings a turbojet engine of conventional construction is indicated generally at 20. As is well known in the art the engine comprises a tubular housing 22 in which a compressor 24 and a turbine 26 are mounted for rotation upstream and downstream, respectively, of an annular combustion chamber or a series of combustion chambers indicated generally at 28. The combustion products and unburned air issuing from the downstream side of the turbine 26 pass through a tail pipe section 30 in which an afterburner, not shown, may be installed and exit from the engine through a continuously variable nozzle 32. The nozzle 32 which may take a number of forms is preferably of the multi-flap fully variable type as shown for example in United States Patent 2,693,078. Nozzles of this type include a control ring 34 which when moved axially, radially displaces a plurality of orifice forming flaps 36.

In the construction shown, movement of the control ring 34 to the left as viewed in Figure 1 will move the flap elements 36 radially inward to restrict the nozzle opening whereas movement of the ring 34 to the right will move the flap elements 36 radially outward to increase the area of the nozzle opening. The nozzle may be moved by a wide variety of mechanical systems. In the system shown a houisng 38 is rigidly connected to the control ring 34 and receives a threaded shaft 40 which is rotatably mounted and fixed against axial movement with respect to the tail pipe 30 by any suitable means not shown. At its outer end the shaft 40 is provided with a driven bevel gear 42 which meshes with a bevel driving gear 44 non-rotatably fixed to one end of a driving shaft 46 suitably mounted on the tail pipe 30 by means not shown. It will be understood that in practice all of the mechanisms shown in Figure 1 will be mounted within an envelope surrounding the engine and the present showing is made merely for purposes of clear illustration. As is well known in the art, balanced actuation of the control ring 34 may be provided bu utilizing a drive system on the opposite side of the control ring similar to that shown in Figure 1 or by providing a connecting yoke surrounding the tail pipe.

The drive shaft 46 represents the output member of the novel control and actuating system with which the present invention is concerned. The input or control element of the system which is indicated generally at 48 is effective to generate a control signal, the sign and magnitude of which corresponds with the error in the position of the nozzle 32. The control device 48 is fully disclosed and claimed in application Serial No. 534,862 to which reference may be had for more detailed description.

For present purposes it may be stated that the unit 48 includes a housing 50 which is divided into two independent chambers 52 and 54 by a diaphragm 56. The chamber 52 at the upper side of the diaphragm 56 is connected through a conduit 58 to the interior of the tail pipe 30 immediately downstream of the turbine 26. The chamber 54 at the lower side of the diaphragm 56 is connected by a conduit 60 to the discharge side of the compressor 24. Chamber 54 also includes a pair of orifices 62 and 64 through which the air bled through the conduit 60 flows. The area and configuration of the orifices 62 and 64 is such that, when the system is in equilibrium, a reference pressure is established in the chamber 54 which is equal to the desired pressure at the downstream side of the turbine. The effective area of the downstream orifice 64 is controlled by a tapered needle 66 mounted on a control rod 67 which moves with the diaphragm 56. As long as the ratio between the compressor discharge pressure and the turbine discharge pressure remains at its desired value the pressures in chambers 52 and 54 will be equal and the diaphragm 56 will occupy the neutral position shown in Figure 1. However if the pressure ratio becomes too high which is usually caused by a relative decrease in the turbine discharge pressure, the pressure in the chamber 54 will temporarily exceed that in the chamber 52 and the diaphragm and the associated needle 66 will be moved upwardly thus enlarging the effective area of orifice 64 and decreasing the pressure in chamber 54.

Conversely, if the pressure ratio becomes too low due to a relative increase in the turbine discharge pressure the diaphragm 56 and needle 66 will be moved downwardly thus decreasing the effective area of orifice 64 and increasing the pressure in chamber 54. Movement of the diaphragm 56 in either direction will continue until equilibrium conditions are established within the unit 48 at which time the diaphragm 56 and the associated needle 66 will be displaced from its neutral position an amount proportional to the error in the turbine discharge pressure and thus provide a direct indication of the error in the position of the nozzle 32. In the present invention displacement of the diaphragm 56 and the associated needle 66 is utilized to energize the actuating system to reposition the nozzle to reestablish the optimum pressure ratio which is desired for the particular engine involved.

The needle 66 carries a movable contact assembly indicated generally at 68 comprising insulated areas 70, 71 and 72 and conducting bands 74 and 76. One side of the contact assembly 68 is engaged by a fixed wiper 78 which is connected by a lead 80 to a battery or other suitable power source 82. The opposite side of the contact assembly 68 is engaged by a fixed wiper 84 which is connected by a lead 86 to one terminal of a normally open switch 88. The other side of the switch 88 is connected by a lead 90 to the power source 82. Also connected to the power source 82 by a lead 92 is a motor 94 which rotates a cam 96 which is effective to periodically close the switch 88. The conducting band 74 is connected to a main lead 98 which is connected through leads 100, 102 and 104 to an electromagnetic brake 106, an electromagnetic clutch 108 and a drive motor 110, respectively. The band 76 is connected to a main lead 112 in turn connected to the brake, clutch and motor by respective leads 114, 116 and 118. The power train for driving the shaft 46 is completed by shafts 120 and 122 which connect the motor 110 to the clutch 108 and the clutch 108 to the brake 106, respectively. The motor 110 is reversible and rotates in the direction to move the nozzle toward open position when the leads 112 and 118 are energized and to move the nozzle toward closed position when the leads 98 and 104 are energized. The clutch 108 is normally disengaged and is engaged when either of the leads 116 or 102 is energized. The brake 106 is normally engaged and is disengaged when of either the leads 100 or 114 is energized.

Accordingly when the apparatus is in the position shown in Figure 1 the motor 110 is deenergized, the clutch 108 is disengaged and the brake 106 is locked or on. However, when either of the leads 98 or 112 is energized the motor rotates in the appropriate direction, the clutch is engaged and the brake is unlocked so that the shaft 46 is rotated in the appropriate direction to move the nozzle 36 toward its corrected position.

While the dimensions and physical characteristics of the components of the control system may be varied widely to suit the requirements of the particular installation, the following dimensions illustrate a typical practical application for controlling a variable area nozzle which produces an area change of about 15% between full open and closed positions. In such a case the cam 96 should rotate at a speed of approximately 250 r.p.m. and the cam and switch 88 are so designed that the switch 88 is closed approximately one-tenth of each revolution. Accordingly, the on-time is one-tenth of a cycle and the off-time is nine-tenths of a cycle. The on-time averages about 0.25 second and the off-time about .225 second. An additional switch similar to the switch 88 and an additional wiper corresponding to the wiper 84 may be provided in parallel with the respective elements shown and so arranged that the wiper 84 contacts only the nozzle closing contact 74 and the additional similar wiper contacts only the nozzle opening contact 76. The gap setting in the additional switch is such that the open cycle current stays on ten to fifteen percent longer than the closing cycle contact to provide slightly greater speed of opening and greater energy to overcome the relatively greater loads encountered in moving the nozzle toward open position.

In practice the width of the contacts 84 and 78 will be approximately .107 inch. The width of the narrow end of the insulated dead band area 71 may be approximately .129 inch while the width of the wider end may be approximately .209 inch. Preferably the nozzle closing contact 74 is more steeply sloped than the opening contact 76 so that the steady current wiper 78 will move approximately .050 inch toward the contact 74 to the point of contact after the pulse wiper 84 has completed the circuit. Moving in the other direction, the steady current wiper 78 will travel approximately .030 inch toward the conductor 76 to the point of contact after the pulse contact 84 has completed the circuit. This asymmetrical construction is provided in order to compensate for the fact that the movement of the diaphragm 56 is not directly proportional to the turbine pressure ratio change.

In operation, assuming for example, that the turbine pressure ratio decreases indicating an increase in turbine discharge pressure and indicating the need for opening the nozzle 32, the pressure in chamber 52 of the unit 48 will temporarily exceed the pressure in chamber 54. If the change in turbine pressure ratio is sufficiently great the contact 74 will be moved into engagement with the wiper 84. As long as the contact 74 and the wiper 84 are in contact the power train will be alternately energized and de-energized. During the period when the switch contacts 88 are closed the motor will be on, the clutch engaged and the brake off and when the contacts 88 are opened the motor will be de-energized, the clutch disengaged and the brake applied.

This arrangement has a significant advantage over the use of a steady signal of variable strength as indicated in Figure 2 in which the rotor speed of motor 110, and the speed of shaft 46 are plotted against nozzle movement. It will be apparent that the rotational energy of the motor 110 is not significantly diminished during the movement of the nozzle although the effective actuation rate of the shaft 46 and accordingly the movement of the nozzle continually decreases as the nozzle approaches its corrected position. Thus the "pulse" has, for a short cycle, the high power input of the full strength signal and accordingly can overcome inertia, mechanical stickiness, operational pressure and friction forces which in an application of this type may change greatly during a single operating cycle as well as during periods between power plant overhaul. Where a steady signal of variable strength is used it is frequently found that on the weak side the system does not provide sufficient power to initiate movement of the controlled element.

As the nozzle is moved toward open position the turbine discharge pressure and consequently the pressure in chamber 52 is reduced permitting the diaphragm 56 and the needle 66 to move back to their original neutral position and breaking the circuit between the wiper 84 and the contact 74 when the nozzle reaches its correct position.

If a substantially greater error in nozzle position is detected by the unit 48 such as may be occasioned by the initiation or cessation of afterburning, the diaphragm 56, the needle 66, and the contact assembly 68 will be displaced sufficiently to bring the steady current wiper 78 into contact with the conducting band 74. The steady current will then dominate and maintain the motor energized, the clutch engaged and the brake off until the position of the nozzle has been corrected sufficiently to break the contact between the wiper 78 and the band 74. Thereafter the nozzle will be pulsed to its corrected position under substantially full power but at a decreased rate.

The performance of the system when a decrease in pressure ratio occurs will be substantially the same.

The dimensions of the various contact elements described above produce a slightly over-damped system so that overcorrection, hunting and surging are eliminated. This is accomplished by a proper proportioning of the width of the insulated or dead band area 71 at its narrow and wide ends to assure breaking the steady current circuit well before the nozzle reaches its corrected position and to assure breaking the pulse circuit shortly before the nozzle reaches its corrected position so that the nozzle will in effect coast to its final corrected position which will position both wipers 78 and 84 in contact with the dead band area 71.

From the foregoing it will be seen that the above stated objects and advantages of the present invention have been attained by the provision of relatively simple, compact, light weight systems for moving an element from an uncorrected position to a corrected position which assures positive and rapid actuation without hunting or surging.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A control system for moving the nozzle of a jet engine from an uncorrected position to a corrected position comprising a power train operatively connected to said nozzle and including a motor, an electromagnetic clutch and an electromagnetic brake, alternate electrical circuits each connected in parallel to said motor, said clutch and said brake, first and second switches in series in one of said circuits, a third switch in the other circuit, means for continuously opening and closing said first switch, means for closing said second switch when said nozzle is less than a predetermined distance from said corrected position, said means also closing said third switch when said element is more than said predetermined distance from said corrective position, said means also being effective to open said second and third switches when said element approaches said corrected position.

2. A control system for moving an element to a corrected position from an uncorrected position comprising: an electric motor, and an electromagnetic clutch effective to connect and disconnect said motor from said element and connected to be engaged when electrically energized, an electromagnetic brake effective when electrically de-energized to stop said element and when electrically energized to permit the movement thereof, alternate electrical power circuits each connected in parallel to said motor, said clutch and said brake and effective when energized to drive said motor, engage said clutch and release said brake; first and second switches in series in one of said circuits; a third switch in the other circuit; means for continuously opening and closing said first switch, means operable in response to displacement of said element a predetermined distance from said corrected position to close said second switch to thereby energize said one of said electrical power circuits to thereby cyclically energize said one of said electric power circuits, said means also closing said third switch to continuously energize said other electrical power circuit when said element is more than said predetermined distance from said corrected position, said means also being effective to open said second and third switches to de-energize both of said electrical power circuits when said element approaches said corrected position.

3. A control system for moving a variable exhaust nozzle of a jet engine toward a corrected position from an uncorrected position comprising, an electric motor connected to move said nozzle when said motor is in operation, alternate electrical power circuits connected in parallel to said motor each being effective, when energized, to drive said motor in either direction, the first of said circuits being effective to be cyclically energized, first and second switches in said first circuit, a third switch in the other circuit, said second and third switches being open when said element is adjacent its corrected position, a switch operator including a device movable in response to changes in the turbine pressure ratio of said jet engine, said switch operator being connected to each of said second and third switches and operable in response to displacement of said nozzle a predetermined distance from said corrected position to close each of said second and third switches thereby to energize each of said electrical power circuits to move said nozzle toward said corrected position at a constant uninterrupted rate, said switch operator being operable when said nozzle reaches a predetermined distance from said corrected position to permit said third switch to assume its normally open position whereby the movement of said nozzle toward its corrected position is under control of said cyclically energized first power circuit.

References Cited in the file of this patent

UNITED STATES PATENTS

| | | |
|---|---|---|
| 2,114,603 | McBain | Apr. 19, 1938 |
| 2,314,019 | Shaw | Mar. 16, 1943 |
| 2,440,228 | Yardeny et al. | Apr. 20, 1948 |
| 2,465,601 | Ochtman | Mar. 29, 1949 |
| 2,537,772 | Lundquist et al. | Jan. 9, 1951 |
| 2,747,152 | Greene | May 22, 1956 |